United States Patent [19]
Marzocchi

[11] 3,837,892

[45] Sept. 24, 1974

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: Jan. 28, 1972

[21] Appl. No.: 221,680

[52] U.S. Cl............... 117/62.1, 57/140 G, 57/153, 117/72, 117/126 GB, 117/126 GE, 117/126 GS, 117/126 GN, 117/161 KP, 117/DIG. 7, 260/77.5 AP, 260/77.5 CR

[51] Int. Cl......................... B32b 17/02, B44d 1/44

[58] Field of Search ........ 117/126 GB, 126 GN, 72, 117/DIG. 7, 161 KP, 126 GS, 126 GE, 62.1; 260/77.5 AP, 77.5 CR

[56] References Cited
UNITED STATES PATENTS

| | | | |
|---|---|---|---|
| 3,455,725 | 7/1969 | Jex | 117/72 |
| 3,537,948 | 11/1970 | Marzocchi | 117/126 GB |
| 3,627,722 | 12/1971 | Seiter | 260/75 NE |
| 3,676,287 | 7/1972 | Flautt | 117/126 GB |

OTHER PUBLICATIONS

Sinclair Petro Chemicals, Hydroxyl Terminated Poly B-D Liquid Resins in Urethane Systems, Bulletin No. 505, June 1967.

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

This invention is addressed to the improvement in the bonding relationship between glass fibers and elastomeric materials in which glass fibers are treated with a functional organo silicon compound containing at least one of an amino, a hydroxy or an epoxy group, and then the glass fibers are treated either with a polyurethane prepolymer containing free isocyanates or an organic polyisocyanate for subsequent reaction with free hydroxyl groups, or a polyurethane prepolymer or a polyhydroxylated compound.

The polyurethane prepolymer containing free isocyanate groups may be prepared by reaction of excess polyisocyanate with a hydroxyl terminated polybutadiene or a polyhydroxylated polyester prepared by reaction of a polyol with a polycarboxylic acid of anhydride containing ethylenic unsaturation. These prepolymers are capable of undergoing co-cure or vulcanization with elastomeric material.

16 Claims, 7 Drawing Figures

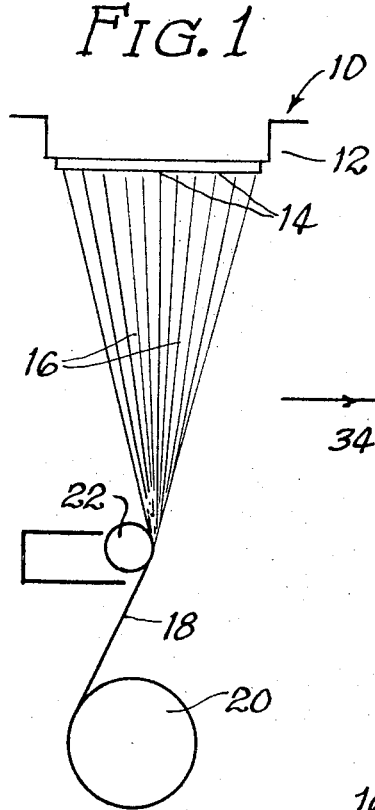
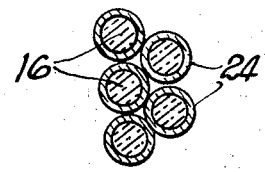
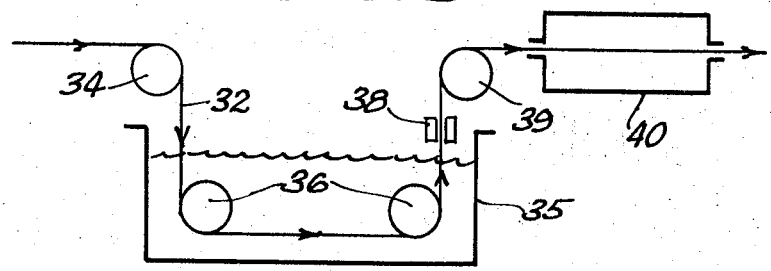
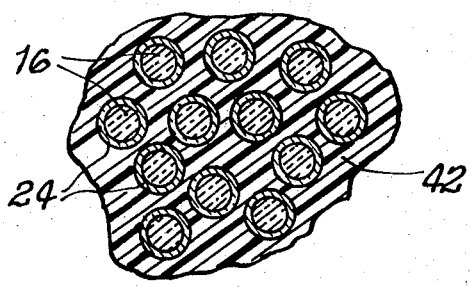
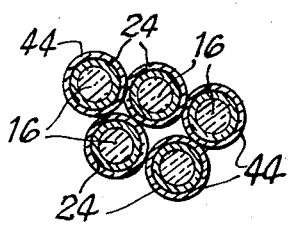
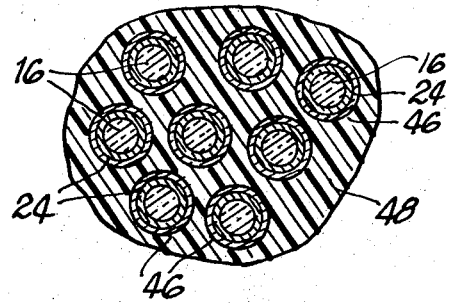
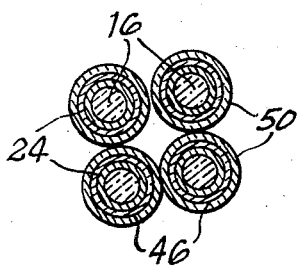

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns and cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as styrene, nitriles, acrylics and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitrile copolymers, butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from three to 20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from two to 12 carbon atoms, polyurethane rubbers and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

In copending application Ser. No. 602,241, filed Dec. 16, 1966 and now abandoned, description is made of a method for the improvement in the bonding relationship between glass fibers and elastomeric materials wherein glass fibers are individually coated in forming while the glass fiber surfaces are in a nascent state with, for example, a polyurethane in the form of a hot melt whereby the polyurethane coating serves to intertie the glass fiber surfaces to the elastomeric material with which the coated glass fibers are combined in the manufacture of glass fiber-elastomeric products. It is believed that, since the glass fibers are coated in forming while in a nascent state, the polyurethane melt is deposited on the glass fiber surfaces before the thin film of moisture referred to above has an opportunity to be formed on the glass fiber surfaces. While the practice of the method of the foregoing copending application represents a significant advance in the establishment of a more secure bonding relationship between the glass fiber surfaces and the elastomeric material with which the glass fibers are subsequently combined, the bond thus established is primarily a physical bond between the polyurethane and the glass fiber surfaces.

It is accordingly an object of the present invention to provide an improved method and composition for treating individual glass fibers, or bundles of glass fibers, to promote the bonding relationship of glass fibers with elastomeric materials in the manufacture of glass fiber-reinforced elastomeric products.

It is a related object of the invention to produce coated glass fibers and impregnated glass fiber bundles for use as reinforcement for elastomeric materials in which the coating or the impregnant in the glass fiber system is secured to the glass fiber surfaces by way of a chemical bond.

It is a further object of the present invention to produce glass fiber-reinforced elastomeric products in which the glass fibers are treated with a composition which is capable of being chemically bonded to the glass fiber surfaces and which is capable of the establishment of a chemical bond between the elastomeric material and the composition whereby the elastomeric material is chemically bonded to the glass fiber surfaces through the composition.

These and other objects and advantages of the invention will appear more fully hereinafter, and, for purposes of illustration, but not of limitation, embodiments of the invention are shown in the accompanying drawing in which:

FIG. 1 is a schematic illustration of the treatment of glass fibers in accordance with one method of the invention;

FIG. 2 is a cross-sectional view of glass fibers treated in accordance with the method illustrated in FIG. 1;

FIG. 3 is a schematic illustration of the further treatment of glass fibers by impregnation of bundles of glass fibers in accordance with the practice of the present invention;

FIG. 4 is a cross-sectional view of the glass fibers treated in accordance with the method illustrated in FIG. 3;

FIG. 5 is a cross-sectional view of an individual glass fiber treated in accordance with another embodiment of this invention;

FIG. 6 is a cross-sectional view of a glass fiber bundle prepared in accordance with yet another embodiment of the invention; and FIG. 7 is a cross-sectional view of individual glass fibers treated in accordance with yet another embodiment of the invention.

It has been found in accordance with the concepts of the present invention that a chemical bond between glass fiber surfaces and a polymeric coating formulated to include a polyurethane can be established by first treating glass fibers with an amino, hydroxy or epoxy silane with a material containing free isocyanate groups. Without limiting the present invention as to theory, it is believed that the silane becomes bonded to the glass surface through the silicon atom

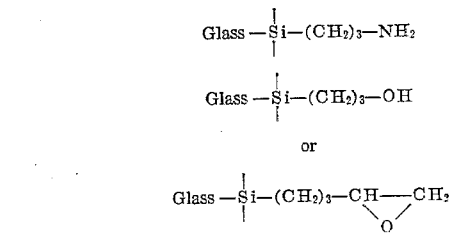

and the functional group of the silane is reactive with the free isocyanate group in accordance with one of the following mechanisms.

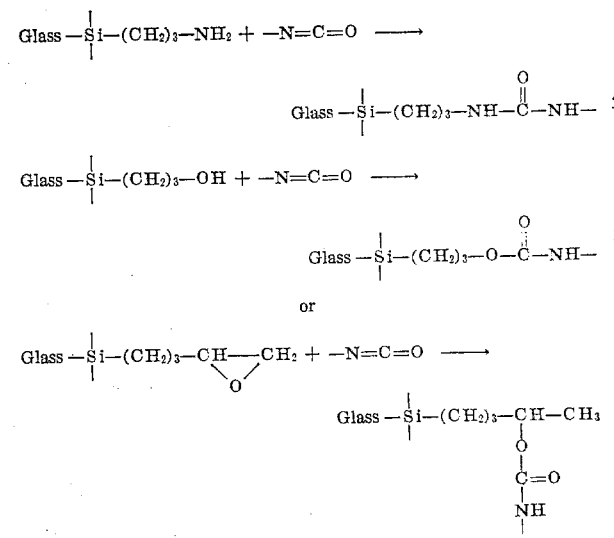

According to one embodiment of the invention, after treatment with the silane, the glass fibers are subjected to further treatment with a prepolymer of an isocyanate containing free isocyanate groups for reaction of the free isocyanate groups of the prepolymer with the functional groups of the silane to establish a chemical bond between the glass fiber surfaces, through the silane, with the prepolymer. Glass fibers treated in this manner can be combined with elastomeric material in the form of continuous or discontinuous, such as chopped, fibers in the manufacture of molded glass fiber-reinforced elastomeric products.

According to another embodiment of the invention, after the glass fibers have been treated with the functional silane, the treated glass fibers can then be subjected to further treatment with an excess polyisocyanate for reaction of the isocyanate with the functional group of the silane. Glass fibers treated in this manner can be then treated with either a polyol or a polyurethane prepolymer containing free hydroxyl groups for subsequent combination with elastomeric materials.

In the practice of the invention, use is made of a silane containing an amino, hydroxy or epoxy group which is reactive with an isocyanate group for the establishment of a chemical bond between the silane and the isocyanate. For this purpose, use can be made of a silane having the formula

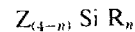

wherein Z is a readily hydrolyzable group such as halogen (e.g., chlorine or bromine), or alkoxy containing one to four carbon atoms (e.g., methoxy, ethoxy, propoxy, etc.), $n$ is an integer from 1 to 3 and R is one or more organic groups attached directly to the silicon atom containing two to eight carbon atoms in which at least one of the organic groups is substituted by, at least, one amino, epoxy or hydroxy group. In addition to the foregoing silanes, use can also be made of the corresponding silanols or polysiloxanes.

Representative of preferred silanes include the linear silanes of the formula

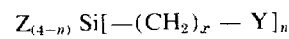

wherein Z and $n$ are as described above, $x$ is an integer from 2 to 8 and Y is either an amino group or a hydroxy group, and silanes of the formula

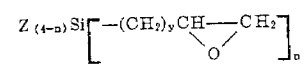

where Z and $n$ are as described above and $y$ is an integer from 1 to 6.

Representative of the foregoing preferred silanes includes beta-aminoethyltrichlorosilane, gamma-aminopropyltriethoxy silane, bis-(gamma-aminopropyl)dimethoxy silane, delta-aminobutyltrimethoxy silane, beta-hydroxyethyltriethoxy silane, gamma-hydroxypropyltrichloro silane, bis-(delta-hydroxybutyl)dimethoxy silane, delta-hydroxybutyltrimethoxy silane, 2,3-epoxypropyltrimethoxy silane, 3,4-epoxybutyltriethoxy silane and bis-(2,3-epoxypropyl) dimethoxy silane.

As will be appreciated by those skilled in the art, a number of other silanes containing at least one organic group substituted by one or more of an amino group, hydroxy group or epoxy group may also be used in the practice of the invention. Such other silanes are represented by:

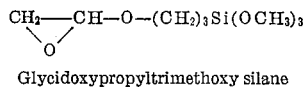

Glycidoxypropyltrimethoxy silane

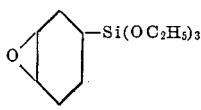

3,4-Epoxycyclohexyltriethoxy silane

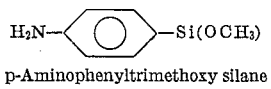

p-Aminophenyltrimethoxy silane

p-Hydroxyphenyltrichloro silane

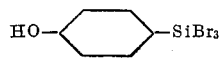

4-Hydroxycyclohexyltribromo silane

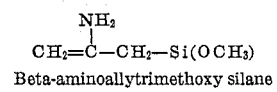

Beta-aminoallytrimethoxy silane

Use can also be made of siloxanes, such as the following preferred siloxanes:

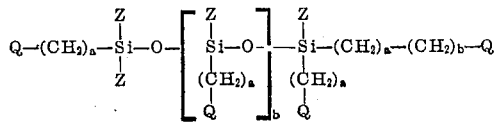

where $a$ is an integer from 2 to 5, $b$ is zero or an integer from 1 to 20, Q is an amino group, a hydroxy group or a glycidoxy group, and Z is as described above.

After the glass fibers have been treated with a functional silane of the type described above, the fibers are preferably, although not necessarily, formed in strands, cords, yarns or fabrics, hereinafter referred to as bundles, and then treated with a polyurethane prepolymer containing free isocyanate group for reaction with the functional group of the silane. For this purpose, use can be made of any of a variety of polyurethane prepolymers formed by reaction of an organic polyisocyanate with an organic polyhydroxylated compound wherein the polyisocyanate is employed in a stoichiometric excess.

Any of a wide variety of polyisocyanates of the type conventionally used in the manufacture of polyurethanes can be used in the present invention. Representative of such isocyanates include toluene diisocyanate (TDI), such as the 2,4- or 2,6-isomers or mixtures thereof, diphenylmethane-4,4'-diisocyanate, polymethylene polyphenylisocyanate, etc.

As the polyhydroxylated compound for use in the preparation of the prepolymer, use can similarly be made of a wide variety of hydroxyl-containing compounds of the types used in the manufacture of polyurethanes. Representative of polyhydroxylated compounds include polyhydric alcohols such as glycerol, trimethylol propane, the alkylene glycols (e.g., ethylene glycol, propylene glycols (e.g., polyoxyethylene glycols, polyoxypropylene glycols, etc.) and polyhydroxylated polycarboxylic acid esters such as those produced by esterification of a polycarboxylic acid or anhydride with one or more of the polyhydroxylated compounds of the type described above, such as polyesters containing at least two hydroxyl groups per molecule formed by reaction of one of the foregoing polyhydroxylated compounds with adipic acid, succinic acid, malonic acid, maleic anhydride or the like.

It is possible and frequently desirable to make use of a polyurethane prepolymer prepared from a polyhydroxylated compound containing ethylenic unsaturation whereby the polyurethane chemically bonded to the glass fiber surfaces through the organo silicon compound is susceptible to vulcanization and/or cure with an elastomeric material with which the treated glass fibers can be subsequently combined. As can be appreciated, after cure and/or vulcanization, the polyurethane serves to intertie, through chemical bonds as described, the elastomer to the glass fiber surfaces.

One of the preferred types of polyhydroxylated compounds containing ethylenic unsaturation for use in the practice of the present invention are the hydroxyl-terminated butadiene polymer systems commercially available from Atlantic-Richfield under the designation "Poly B-D" resins. For example, use can be made of hydroxyl-terminated butadiene homopolymers (e.g., Poly B-D R-15M which has a hydroxyl number of 42 or Poly B-D R-45M), hydroxyl-terminated butadiene-styrene copolymers (e.g., Poly B-D CS-15) or hydroxyl terminated butadiene-acrylonitrile copolymers (e.g., Poly B-D CN-15 which has a hydroxyl number of 39). Such systems contain ethylenic unsaturation, and are therefore capable of undergoing cure and/or vulcanization with elastomeric materials.

Another type of polyhydroxylated compound which contains ethylenic unsaturation and which is well suited for use in the present invention are polyesters formed by reaction of one of the polyols described above and a polycarboxylic acid or anhydride containing ethylenic unsaturation, such as maleic acid, fumaric acid, glutaconic acid, 2-octenedioic acid, etc. Such acids are generally aliphatic polycarboxylic acids containing four to 12 carbon atoms.

The prepolymer employed in the practice of the present invention is generally prepared by reaction of the polyhydroxylated compound with a stoichiometric excess of the polyisocyanate, with the mole ratio of isocyanate groups to hydroxy groups preferably being at least 1.5, and most preferably within the range of 2 to 4. The reaction can be carried out in the presence of a catalyst of the type normally used in the preparation of polyurethanes such as tertiary amine, tin soaps, organo tin compounds, etc. However, the use of a catalyst is not required.

As indicated, it is also possible to treat the glass fibers with a polyisocyanate of the type described after the fibers have been first treated with a functional silane. Without limiting this concept of the invention as to theory, it is believed that the silane is first bonded to the glass surface through the silicon atoms, and one isocyanate group of the polyisocyanate reacts with a functional group of the silane, thereby leaving at least one isocyanate group free for reaction, as illustrated below:

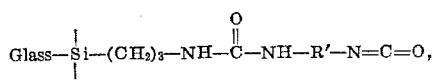

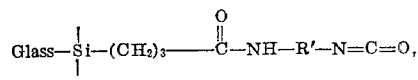

or

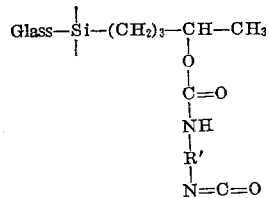

with R' representing the residue of the polyisocyanate.

The free isocyanate group bonded to the glass fiber surface through the organo silicon compound is thus available for reaction with a polyurethane prepolymer containing a free hydroxyl group, a polyurethane polymer, such as polyurethane rubber, or a polyhydroxylated compound of the type described above.

Having described the basic concepts of the invention, reference is now made to the following examples which are provided by way of illustration, and not by way of limitation, of the practice of the invention in treating glass fibers and the combination of treated glass fibers with elastomeric materials in the manufacture of glass fiber-reinforced elastomeric products.

EXAMPLE 1

This example illustrates the treatment of glass fibers with an amino silane followed by treatment of the fibers with a polyurethane prepolymer.

Glass fibers are first treated, preferably in forming, with an amino silane which can be formulated in an aqueous treating composition as follows:

Delta-aminobutyltriethoxy silane — 1.5 percent
Water — 98.5 percent

Referring now to the schematic diagram of FIG. 1, the glass is melted in a glass melting furnace 10 having a bushing 12 on the bottom side. The bushing is formed with a plurality of openings extending therethrough, and the molten glass flows gravitationally through the small openings in the bushing to form therein streams 14 which are rapidly attenuated into fine glass filaments 16 by winding the filaments about a rapidly rotating drum 20. The filaments 16 are coated with the silane as they are gathered together to form a strand 18.

For this purpose, use is made of an applicator 22 which is illustrated as a wiping pad and is constantly wet with silane treating composition. The filaments 16 are each wet with the treating composition as they are gathered together to form the strand 18 which is wound about drum 20.

The strand of coated fibers are then allowed to air dry, although the drying of the fibers can be accelerated by exposure to an elevated temperature, such as a temperature within of the range of 150° to 250°F., depending somewhat on the boiling point of the particular silane employed. The resulting fibers are shown in FIG. 2 wherein the silane forms a thin coating 24 on the filaments 16.

After the strands of fibers are dried, the strands are twisted and/or plied together to form a glass fiber bundle, and are treated with a polyurethane prepolymer prepared by reaction of the following reaction mixture:

|  | Moles |
|---|---|
| Toluene diisocyanate (80/20 mixture of 2,4- and 2,6-isomers) | 2.0 |
| Hydroxyl terminated poly- butadiene (Poly B-D R-15M) | 0.8 |
| Catalyst (tin octoate) | 0.001 |

The prepolymer is applied to the glass fiber bundle in the form of an impregnant by immersion of the bundle in a bath of the fluid prepolymer. Referring specifically to FIG. 3 of the drawing, a glass fiber bundle in which the individual filaments have been coated with the amino silane is advanced over a guide roller 34 for passage downwardly into an impregnating bath 35 containing the prepolymer. The bundle 32 is then passed under a pair of rollers 36 to effect a sharp bend in the bundle which operates to open the bundle to facilitate more complete penetration of the prepolymer into the bundle. The bundle impregnated with the prepolymer is then raised from the bath for passage through a roller or die 38 which operates to remove excess amounts of the prepolymer from the bundle and to work the prepolymer into the bundle.

Thereafter, the endless bundle is advanced over a roller 39 preferably into an oven, such as an air drying oven, maintained at a temperature above ambient temperature (e.g., temperatures from 85° to 250°F.) to complete the reaction of the polyisocyanate with the amino silane and the polyhydroxylated compound and set the polyurethane in the bundle.

The resulting bundle is shown in cross section in FIG. 4 of the drawing, and comprises the individual filaments 16, having the silane coating 24 on the surfaces, distributed in the polyurethane 42 formed by completion of the reaction. As can be seen in this figure, the polyurethane thus formed serves to separate the individual filaments each from the other and define a unitary bundle structure. As indicated above, it is believed that the polyurethane is chemically bonded to the glass fiber surfaces through the organo silicon compound.

The bundle thus produced can be used as a reinforcement for elastomeric materials as hereinafter described. However, it will be appreciated by those skilled in the art that the bundle, after impregnation, can be directly combined with an elastomeric material without first heating the bundle to complete the reaction between the polyisocyanate and the polyhydroxylated compound. When using the latter procedure, the complete formation of the polyurethane from the prepolymer is believed to take place during the cure and/or vulcanization of the bundle impregnated with prepolymer in combination with an elastomeric material in the manufacture of fiber-reinforced elastomeric products.

EXAMPLE 2

This example illustrates the treatment of glass fibers with a hydroxy silane followed by the treatment of the fibers with a polyurethane prepolymer.

Using the procedure described in Example 1, glass fibers are treated in forming with a hydroxy silane composition as follows:

Gamma-hydroxypropyltrimethoxy silane — 2.0 percent by wt.
Water — 98.0 percent by wt.

Application of the silane is made in an amount to deposit a coating constituting 0.1 to 5 percent by weight of the silane.

The fibers in this example are then treated with a polyurethane prepolymer in the form of individual filaments without first forming the fibers into a bundle whereby the prepolymer serves to coat the individual filaments over the silane coating. The prepolymer is applied in an amount to deposit 1 to 12 percent by weight of the fibers.

The polyurethane prepolymer used in this example is prepared by reacting the following composition:

|  | Moles |
|---|---|
| Diphenylmethane-4,4'-diisocyanate | 3.5 |
| Polyester of maleic anhydride and glycerol (av. MW 2000) | 0.7 |

The prepolymer can be applied to coat the fibers in any conventional manner, and the resulting double coated fibers are shown in FIG. 5 of the drawing. As can be seen in this figure, the fibers 16 are coated with the silane 24 and the prepolymer coating 44 overlays the silane coating 24.

As indicated above, the prepolymer can be further reacted by heating to set the prepolymer as a polyurethane and to insure reaction between free isocyanate groups in the prepolymer with the hydroxy group of the silane, or the glass fibers can first be combined with an elastomeric material whereby further reaction of the prepolymer to form a polyurethane occurs during cure and/or vulcanization of the fibers in combination with the elastomeric material.

EXAMPLE 3

This example illustrates the treatment of glass fibers with an epoxy silane followed by treatment with a prepolymer.

Using the procedure described in Example 1, glass fibers are coated with the following epoxy silane composition:

2,3-Epoxypropyltrimethoxy silane — 2.0 percent by wt.
Lubricant (lauryl dimethylamine) — 0.2 percent by wt.
Water — 97.8 percent by wt.

Thereafter, the fibers are dried, formed into a bundle as described in Example 1, and then the bundle is impregnated with a prepolymer prepared from polymethylene polyphenylisocyanate and polyoxypropylene wherein the mole ratio of isocyanate groups to hydroxy groups is 2.1.

Application of the prepolymer is made in an amount to deposit the impregnant in the bundle in an amount constituting 5 to 25 percent by weight of the glass fiber system.

EXAMPLE 4

This example illustrates the treatment of glass fibers with a functional silane followed by the sequential steps of treatment with a polyisocyanate and a polyhydroxylated compound.

Using a procedure described in Example 1, glass fibers are coated with an amino silane using the following coating composition:

Gamma-aminopropyltrimethoxy silane — 2.5 percent by wt.
Water — 97.5 percent by wt.

Thereafter, the fibers are dried and coated with the following composition:

Toluenediisocyanate — 5 percent by wt.
Acetone (solvent) — 95 percent by wt.

After the fibers are coated with the isocyanate, the fibers are dried to effect removal of the solvent and to effect reaction between the functional group of the silane with the isocyanate.

The glass fibers are then formed into bundles of glass fibers as described in Example 1 and impregnated with the following composition:

|  | Parts by wt. |
|---|---|
| Hydroxyl-terminated butadiene acrylonitrile copolymer (Poly B-D CN-15, hydroxyl number 39) | 35 |
| Acetone | 65 | using the procedure described in Example 1.

The resulting bundle is shown in FIG. 6 as formed of fibers 16 having a first and second coatings 24 and 46 formed of the silane and polysiocyanate, respectively, with the impregnant 48 being the butadiene copolymer. It is believed that the polyisocyanate is chemically bonded to the glass fiber surfaces through the organo silicon compound as described above, and that the butadiene copolymer is bonded to the isocyanate through a urethane bond.

EXAMPLE 5

The procedure described in Example 4 is repeated, except that use is made of glycidoxypropyltrimethoxy silane in place of the amino silane.

After treatment with the polyisocyanate, the fibers are then individually coated with a third coating of the maleic acid-glycerol polyester described in Example 1 without forming the fibers into a bundle.

The resulting triple coated fibers are shown in FIG. 7 of the drawing, and contain three successive coatings of the silane 24, the polyisocyanate 46 and the polyhydroxylated polyester 50, respectively. As in the case of the bundle produced in Example 4, it is believed that the polyester is bonded to the glass fiber surfaces through the polyisocyanate and the organo silicon compound.

EXAMPLE 6

This example illustrates the treatment of glass fibers with an amino silane followed by the sequential steps of coating with a polyisocyanate and impregnation with a prepolymer containing free hydroxyl groups.

Using the procedure described in Example 4, glass fibers are first coated with an amino silane by applying to the glass fiber surfaces the following composition:

Gamma-aminopropyltrimethoxy silane — 2.0 percent
Water — 98.0 percent

After drying, the coated fibers are then subjected to a second coating operation with the toluene diisocyanate coating composition of Example 4.

Thereafter, the double coated fibers are formed into a bundle of strands of glass fibers and the bundle is impregnated with a prepolymer containing free hydroxyl groups using the procedure described in Example 1. The prepolymer is prepared by prepolymerizing the following composition:

|  | Moles |
| --- | --- |
| Toluene diisocyanate | 1.0 |
| Gutaconic acid-glycerol polyester | 3.0 |
| Catalyst | 0.001 |

When using such prepolymers in accordance with this concept of the invention, the molar ratio of free hydroxyl group to free isocyanate groups in the prepolymer is preferably within the range of 0.20 to 0.60.

The resulting impregnated bundle can then be heated to set and cure the polyurethane in the bundle, or the bundle can be combined with an elastomeric material whereby cure and setting of the polyurethane takes place during cure and/or vulcanization of the glass fiber bundle-elastomer composite.

In the combination of glass fibers, treated in accordance with the practice of this invention, with elastomeric materials, the glass fibers or bundles of glass fibers are mixed with the elastomeric material or otherwise laid down in the desired arrangement for combination with the elastomeric material as in the manufacture of glass fiber-reinforced belts or in the manufacture of rubber tires reinforced with cords of glass fibers, with the elastomeric material with which the glass fibers are combined constituting a continuous phase. The elastomer constituting this continuous phase can be employed in the cured or uncured stage or in the vulcanized or unvulcanized stage.

The combinations of glass fibers and elastomeric materials are then processed in a conventional manner by molding or curing under heat and pressure or by vulcanization for advancement of the elastomeric material to a cured or vulcanized state while in combination with the treated glass fibers whereby the glass fibers become strongly integrated with the elastomeric material in the glass fiber-reinforced elastomeric products. It is believed that the tie-in between the treated glass fibers and the elastomer constituting the continuous phase occurs primarily during cure or vulcanization of the elastomeric materials in combination with the treated glass fibers as described above.

The following example will serve to illustrate the manufacture of glass fiber-reinforced elastomeric products using glass fibers treated in accordance with the concepts of this invention.

EXAMPLE 7

Bundles of glass fibers prepared in accordance with the procedures described in Example 1 are combined with natural rubber in an unvulcanized state and compounded to include vulcanizers and accelerators to advance the elastomeric material in combination with the glass fiber bundles to a cured or vulcanized state. Thereafter, the glass fiber bundle-elastomer composite is molded under heat and pressure in a conventional manner to form a glass fiber bundle-reinforced elastomeric product. It is found that a secure bonding relationship has been established between the elastomeric material and the glass fiber surfaces through the polyurethane impregnant in the glass fiber bundle.

EXAMPLE 8

Using the procedures described in Example 7, glass fibers treated in accordance with the procedures described in Example 2 are chopped into short lengths, preferably within the range of 0.1 to 0.5 inch, and admixed with natural rubber in an unvulcanized state which has been compounded to include vulcanizers and accelerators. Thereafter, the combination of the elastomeric material and the treated, chopped fibers is molded under heat and pressure to form a glass fiber-elastomeric product. Again, it is found that a secure bonding relationship is achieved between the glass fibers and the elastomeric material.

EXAMPLE 9

Using the procedure described in Example 7, glass fiber bundles prepared in Example 6 are combined with a polyurethane rubber having the following composition:

|  | Parts by weight |
| --- | --- |
| Polyurethane elastomer Mooney $M_2$ of 50 at 212°F | 100 |
| Carbon Black (ISAF Black) | 30 |
| Lubricant (stearic acid) | 0.2 |
| Curing Agent (Di Cup 40 C) | 5.0 |

The polyurethane rubber used in this example is a polyurethane elastomer commercially available from the General Tire and Rubber Company under the trade name "Genthane S." The curing agent, Di Cup 40 C, is a commercial curing agent sold by Hercules, and contains 40 percent by weight dicumyl peroxide on precipitated calcium carbonate.

13

It is found that a strong bonding relationship is established between the treated bundle and urethane rubber.

Example 10

Using the procedure described in Example 7, glass fibers treated in Example 5 are combined with a castable urethane rubber formulated as follows:

|  | Parts by weight |
| --- | --- |
| Polyester based urethane polymer (Cyanaprene A-9, American Cyanamid) | 100 |
| Curing agent | 13 |
| Naphthenic processing oil (Circo Oil from Sun Oil Corp.) | 1 |

The urethane polymer used in this example is, as indicated above, a commercial polymer from American Cyanamid having a specific gravity of 1.18 and a melting point of 150°F. The curing agent employed is Cyanaset H from American Cyanamid which is a mixture of methylene bis-(o-chloroanilin) and dichlorobenzidine.

It is found that a secure bonding relationship between the treated glass fibers and the urethane is established.

It will be apparent from the foregoing that I have provided a new and improved method for use in the treatment of glass fibers to enhance their utilization with elastomeric conditions whereby it is possible to establish a series of chemical bonds between the glass fiber surfaces and the elastomeric materials with which the glass fibers are combined.

It will be understood that the invention exists not only in the compositions employed in the practice of this invention but also the process in which the compositions are employed as well as the treated glass fiber products and glass fiber-reinforced elastomeric products formed thereby.

It will be understood that various modifications and changes may be made in procedures, formulation and use without departing from the spirit of the invention, especially as defined in the following claims.

I claim:

1. In the method for the treatment of glass fibers to enhance the bonding relationship between glass fibers and elastomeric materials with which the glass fibers are combined in the manufacture of glass fiber-elastomeric products, the improvement comprising coating the glass fibers with an organo silicon compound containing at least one organic group substituted by at least one functional group selected from the group consisting of an amino group, a hydroxy group and an epoxy group, forming the coated fibers into a bundle, treating the resulting bundled fibers with a polyurethane prepolymer containing free isocyanate groups for reaction of the free isocyanate groups with the functional group of the silicon compound to deposit the prepolymer in the bundle as an impregnant therein and combining the impregnated bundle with an elastomeric material constituting a continuous phase under conditions of heat and pressure.

2. The method as defined in claim 1 wherein the prepolymer is prepared by reaction of a polyisocyanate with an organic polyhydroxylated compound in which the mole ratio of isocyanate groups to hydroxyl groups is at least 1.5.

3. The method as defined in claim 2 wherein the mole ratio of isocyanate groups to hydroxyl groups is within the range of 2 to 4.

4. The method as defined in claim 1 wherein the organo silicon compound is selected from the group consisting of a silane of the formula $$Z_{(4-n)} Si R_n$$

wherein Z is a readily hydrolyzable group, $n$ is an integer from 1 to 3 and R represents an organic group containing two to eight carbon atoms in which at least one of the R group is substituted by at least one of said functional groups, the corresponding silanols and polysiloxanes.

5. The method as defined in claim 1 wherein the prepolymer is prepared by reaction of a polyisocyanate with a polyhydroxylated compound containing ethylenic unsaturation whereby the prepolymer is capable of undergoing care and/or vulcanization in combination with elastomeric material.

6. The method as defined in claim 5 wherein the polyhydroxylated compound is a hydroxyl-terminated polybutadiene.

7. The method as defined in claim 5 wherein the polyhydroxylated compound is a polyhydroxylated polyester prepared by reaction of a polyol with a polycarboxylic acid or anhydride containing ethylenic unsaturation.

8. The method as defined in claim 1 wherein the bundles are formed of strands of glass fibers.

9. Glass fibers having a first coating on the surfaces thereof comprising an organo silicon compound containing at least one organic group substituted by at least one functional group selected from the group consisting of an amino group, a hydroxy group and an epoxy group, said glass fibers being in the form of a bundle and containing an impregnant in the bundle comprising a polyurethane prepolymer prepared by reaction of excess polyisocyanate with a polyhydroxylated compound selected from the group consisting of a hydroxyl terminated polybutadiene and a polyhydroxylated polyester prepared by reaction of a polyol with a polycarboxylic acid or anhydride containing ethylenic unsaturation, whereby the free isocyanate groups of the prepolymer have reacted with the functional group of the organo silicon compound and the prepolymer is capable of undergoing co-cure or vulcanization with an elastomeric material.

10. Glass fibers as defined in claim 9 wherein the prepolymer is prepared by reaction of a polyisocyanate with an organic polyhydroxylated compound in which the mole ratio of isocyanate groups to hydroxyl groups is at least 1.5.

11. Glass fibers as defined in claim 9 wherein the organo silicon compound is selected from the group consisting of a silane of the formula $$Z_{(4-n)} Si R_n$$

wherein Z is a readily hydrolyzable group, $n$ is an integer from 1 to 3 and R represents an organic group containing two to eight carbon atoms in which at least one of the R group is substituted by at leas one of said functional groups, the corresponding silanols and polysiloxanes.

12. Glass fibers are defined in claim 9 wherein the polyhydroxylated compound is a hydroxyl-terminated polybutadiene.

13. Glass fibers as defined in claim 9 wherein the polyhydroxylated compound is a polyhydroxylated polyester prepared by reaction of a polyol with a polycarboxylic acid or anhydride containing ethylenic unsaturation.

14. Glass fibers as defined in claim 9 wherein the strands of glass fibers are plied and twisted together.

15. In a glass fiber reinforced elastomeric product in which an elastomeric material constitutes a continuous phase in which the glass fibers are distributed, the improvement in the bonding relationship between the glass fibers and the elastomeric material comprising a bundle of glass fibers having a first coating on the surface thereof comprising an organo silicon compound containing at least one organic group substituted by at least one functional group selected from the group consisting of an amino group, a hydroxy group and an epoxy group, and an impregnant in the bundle comprising a polyurethane prepolymer prepared by reaction of excess polyisocyanate with a polyhydroxylated compound selected from the group consisting of a hydroxyl terminated polybutadiene and a polyhydroxylated polyester prepared by reaction of a polyol with a polycarboxylic acid or anhydride containing ethylenic unsaturation, whereby the free isocyanate groups of the prepolymer have reacted with the functional group of the organo silicon compound and the prepolymer is capable of undergoing co-cure or vulcanization with an elastomeric material.

16. In a glass fiber reinforced elastomeric product as defined in claim 15 wherein the bundle is in the form of strands of glass fibers which have been plied and twisted together.

\* \* \* \* \*